US012631304B2

(12) United States Patent
Hebeisen

(10) Patent No.: US 12,631,304 B2
(45) Date of Patent: May 19, 2026

(54) WIRED POCKET WITH EXTERIOR LIGHTING

(71) Applicant: Mechoshade Systems, LLC, Middleton, WI (US)

(72) Inventor: Stephen P. Hebeisen, Amawalk, NY (US)

(73) Assignee: MECHOSHADE SYSTEMS, LLC, Middleton, WI (US)

( * ) Notice: Subject to any disclaimer, the term of this patent is extended or adjusted under 35 U.S.C. 154(b) by 258 days.

(21) Appl. No.: 18/532,816

(22) Filed: Dec. 7, 2023

(65) Prior Publication Data

US 2024/0200740 A1 Jun. 20, 2024

Related U.S. Application Data

(60) Provisional application No. 63/433,232, filed on Dec. 16, 2022.

(51) Int. Cl.

*E06B 9/68* (2006.01)
*E06B 9/42* (2006.01)

(Continued)

(52) U.S. Cl.

CPC ................ *F21S 13/14* (2013.01); *E06B 9/42* (2013.01); *E06B 9/68* (2013.01); *F21V 11/18* (2013.01);

(Continued)

(58) Field of Classification Search

CPC .......... E06B 9/42; E06B 9/50; E06B 9/17007; E06B 9/68; E06B 2009/6809; E06B 2009/6827; E06B 2009/247

See application file for complete search history.

(56) References Cited

U.S. PATENT DOCUMENTS 1,457,026 A 5/1923 Hanses
1,576,412 A 3/1926 Cronk (Continued)

FOREIGN PATENT DOCUMENTS

AT 399200 3/1995
DE 3806611 9/1989

(Continued)

OTHER PUBLICATIONS

USPTO; Non-Final Office Action dated May 28, 2020 in U.S. Appl. No. 16/728,339.

(Continued)

*Primary Examiner* — Johnnie A. Shablack
(74) *Attorney, Agent, or Firm* — SNELL & WILMER L.L.P.

(57) ABSTRACT

The window shade pocket system may comprise a pocket having a first wall and a second wall; a window shade having a first side and a second side, wherein the window shade is mounted within the pocket and is configured to at least partially extend over a window outside of the pocket; and a first bracket removably affixed to at least one of a closure extending from the first wall, the first wall or the second wall, wherein the first bracket retains a light source, and wherein the light source is configured to illuminate an exterior area outside of the window. The light source may illuminate the exterior area outside of the window, in response to at least one of an opening of the window, an object coming through the window, a person coming through the window, an object passing by the window or a person passing by the window.

20 Claims, 13 Drawing Sheets

(51) Int. Cl.

| | |
|---|---|
| ***F21S 13/14*** | (2006.01) |
| ***F21V 11/18*** | (2006.01) |
| *E06B 9/24* | (2006.01) |

(52) U.S. Cl.

CPC . *E06B 2009/247* (2013.01); *E06B 2009/6827* (2013.01)

(56) References Cited

U.S. PATENT DOCUMENTS

| | | | | |
|---|---|---|---|---|
| 1,590,862 | A | 6/1926 | Seaquist | |
| 1,872,737 | A | 8/1932 | House | |
| 1,892,150 | A | 12/1932 | Hutchins et al. | |
| 2,395,073 | A | 2/1946 | Schepmoes | |
| 2,506,209 | A | 5/1950 | Glass | |
| 3,007,036 | A | 10/1961 | Mills, Jr. | |
| 3,271,568 | A | 9/1966 | Lundberg | |
| 3,938,269 | A | 2/1976 | Catteau | |
| 4,060,310 | A | 11/1977 | Brown | |
| 4,156,270 | A | 5/1979 | Beatty | |
| 4,169,658 | A | 10/1979 | Brown | |
| 4,254,813 | A | 3/1981 | Vecchiarelli | |
| 4,404,770 | A | 9/1983 | Markus | |
| 4,753,025 | A | 6/1988 | Wennstrom | |
| 5,046,380 | A | 9/1991 | Matsumoto et al. | |
| 5,067,540 | A | 11/1991 | Besler | |
| 5,121,782 | A | 6/1992 | Renkhoff | |
| 5,148,849 | A | 9/1992 | Faludy | |
| 5,296,964 | A | 3/1994 | Shopp | |
| 5,413,161 | A | 5/1995 | Corazzini | |
| 5,426,879 | A | 6/1995 | Hecker | |
| 5,438,780 | A | 8/1995 | Winner | |
| 6,084,231 | A * | 7/2000 | Popat | E06B 9/32 160/5 |
| 6,111,694 | A | 8/2000 | Shopp | |
| 6,230,782 | B1 | 5/2001 | Reichert | |
| 6,253,492 | B1 | 7/2001 | Finke | |
| 6,388,404 | B1 | 5/2002 | Schnebly et al. | |
| 6,410,908 | B1 | 6/2002 | Anderson et al. | |
| 6,421,175 | B1 | 7/2002 | Shopp | |
| 6,446,394 | B1 | 9/2002 | Finke | |
| 6,532,109 | B1 | 3/2003 | Shopp | |
| 6,736,186 | B2 | 5/2004 | Anderson | |
| 6,816,308 | B1 | 11/2004 | Shopp | |
| 6,873,461 | B1 | 3/2005 | McPherson, Jr. | |
| 6,877,548 | B1 * | 4/2005 | Chartier | F21V 27/00 160/10 |
| 7,350,325 | B1 | 4/2008 | Wang | |
| 7,559,707 | B2 | 7/2009 | Shopp | |
| 7,877,914 | B2 | 2/2011 | Taylor et al. | |
| 7,882,652 | B2 | 2/2011 | Elliott et al. | |
| 8,505,865 | B2 | 8/2013 | Wills et al. | |
| 8,684,062 | B2 | 4/2014 | Ng | |
| 9,115,537 | B2 | 8/2015 | Blair | |
| 9,169,690 | B2 * | 10/2015 | Blair | E06B 9/24 |
| 9,210,784 | B2 | 12/2015 | Antoniazzi | |
| 9,328,906 | B1 * | 5/2016 | Bennington | E06B 9/264 |
| 9,617,785 | B2 | 4/2017 | Chou | |
| 9,725,947 | B2 * | 8/2017 | Seehof | B60J 5/08 |
| D808,684 | S | 1/2018 | Santilli | |
| 10,115,325 | B2 | 10/2018 | Scaturro et al. | |
| D854,855 | S | 7/2019 | Garcia Garcia | |
| 10,544,622 | B2 * | 1/2020 | Hebeisen | E06B 9/42 |
| 10,808,455 | B2 | 10/2020 | Hebeisen | |
| 10,876,305 | B2 | 12/2020 | Underkofler | |
| 11,293,218 | B2 * | 4/2022 | Hebeisen | G09F 11/18 |
| 11,719,038 | B2 * | 8/2023 | Hebeisen | E06B 9/42 160/368.1 |
| 11,821,261 | B2 * | 11/2023 | Hebeisen | H03K 17/962 |
| 12,007,111 | B2 * | 6/2024 | Siebenaller | F21K 9/68 |
| 12,144,903 | B2 * | 11/2024 | Hebeisen | A61L 2/10 |
| 12,421,796 | B2 * | 9/2025 | Church | E06B 9/24 |
| 2004/0064986 | A1 | 4/2004 | Anderson | |
| 2004/0107613 | A1 | 6/2004 | Park | |
| 2005/0081413 | A1 | 4/2005 | Ko | |
| 2005/0205216 | A1 | 9/2005 | Vrielink | |
| 2006/0109651 | A1 | 5/2006 | Cocciardi | |
| 2006/0207730 | A1 | 9/2006 | Berman et al. | |
| 2008/0271856 | A1 * | 11/2008 | Paulussen | E06B 9/386 160/10 |
| 2008/0289775 | A1 | 11/2008 | Lukos | |
| 2010/0038042 | A1 | 2/2010 | Criss | |
| 2011/0220299 | A1 | 9/2011 | Berman et al. | |
| 2012/0102796 | A1 | 5/2012 | Kara | |
| 2012/0159823 | A1 | 6/2012 | Gibb et al. | |
| 2013/0016497 | A1 | 1/2013 | Anderson | |
| 2013/0068398 | A1 | 3/2013 | Wills | |
| 2013/0118044 | A1 | 5/2013 | Scaturro et al. | |
| 2017/0114593 | A1 | 4/2017 | Hebeisen et al. | |
| 2017/0362827 | A1 | 12/2017 | Geiger | |
| 2018/0047317 | A1 | 2/2018 | Mahedy | |
| 2018/0106102 | A1 | 4/2018 | Holt et al. | |
| 2018/0163465 | A1 | 6/2018 | Biedermann | |
| 2018/0202157 | A1 | 7/2018 | Neal | |
| 2019/0057629 | A1 | 2/2019 | Kicera | |
| 2020/0063447 | A1 | 2/2020 | Brinkman et al. | |
| 2020/0386380 | A1 | 12/2020 | Yamamoto et al. | |
| 2021/0222490 | A1 | 7/2021 | Campagna et al. | |
| 2021/0277716 | A1 * | 9/2021 | Hebeisen | G06F 3/016 |
| 2021/0330837 | A1 | 10/2021 | Hebeisen | |
| 2025/0314128 | A1 * | 10/2025 | Haynes | F21V 3/00 |

FOREIGN PATENT DOCUMENTS

| | | |
|---|---|---|
| DE | 102005010702 | 9/2006 |
| DE | 102007059388 | 6/2009 |
| DE | 102011116707 | 4/2013 |
| DE | 202012103629 | 9/2013 |
| DE | 102013016819 | 6/2014 |
| EP | 743420 | 11/1996 |
| EP | 2602421 | 6/2013 |
| EP | 2631415 | 8/2013 |
| EP | 2843178 | 8/2013 |
| EP | 3521543 | 8/2019 |
| FR | 2845725 | 4/2004 |
| FR | 2911364 | 7/2008 |
| GB | 2542330 | 3/2017 |
| JP | 2000192757 | 7/2000 |
| JP | 2003221987 | 8/2003 |
| JP | 2004076300 | 3/2004 |
| JP | 2014214524 | 1/2010 |
| JP | 2013108238 | 6/2013 |
| JP | 2013170441 | 9/2013 |
| JP | 2014234593 | 12/2014 |

OTHER PUBLICATIONS

USPTO; Notice of Allowance dated Jul. 24, 2020 in U.S. Appl. No. 16/728,339.

UKIPO, Combined Search and Examination Report dated Mar. 9, 2017 in GB Application No. GB1618179.4.

UKIPO, Examination Report dated Jul. 6, 2017 in GB Application No. GB1618179.4.

CIPO, Notice of Allowance dated Jan. 4, 2018 in Canadian Application No. 2,946,634.

CIPO, Office Action dated Aug. 30, 2017 in Canadian Application No. 2,946,634.

USPTO, Restriction/Election Requirement dated Aug. 29, 2018 in U.S. Appl. No. 15/334,591.

USPTO, Non-Final Office Action dated Sep. 17, 2018 in U.S. Appl. No. 15/334,591.

UKIPO, United Kingdom Examination Report dated Nov. 29, 2018 in Application No. GB1618179.4.

USPTO, Final Office Action dated Apr. 24, 2019 in U.S. Appl. No. 15/334,591.

USPTO, Advisory Action dated May 16, 2019 in U.S. Appl. No. 15/334,591.

USPTO, Non-Final Office Action dated Jun. 13, 2019 in U.S. Appl. No. 15/334,591.

USPTO, Notice of Allowance dated Sep. 20, 2019 in U.S. Appl. No. 15/334,591.

(56) References Cited

OTHER PUBLICATIONS

USPTO, Notice of Allowance dated Jan. 5, 2022 in U.S. Appl. No. 17/019,585.
USPTO, Non-Final Office Action dated Nov. 2, 2022 in U.S. Appl. No. 17/577,912.
USPTO, Non-Final Office Action dated Apr. 20, 2023 in U.S. Appl. No. 17/577,912.
USPTO, Final Office Action dated Jun. 6, 2023 in U.S. Appl. No. 17/577,912.
USPTO, Notice of Allowance dated Jun. 13, 2023 in U.S. Appl. No. 17/577,912.
USPTO, Non-Final Office Action dated Aug. 23, 2021 in U.S. Appl. No. 17/019,585.

* cited by examiner

WIRED POCKET WITH EXTERIOR LIGHTING

CROSS-REFERENCE TO RELATED APPLICATIONS

This application claims the benefit of, and priority to, U.S. Provisional Application Ser. No. 63/433,232 filed on Dec. 16, 2022 and entitled "WIRED POCKET WITH EXTERIOR LIGHTING," which is hereby incorporated by reference in its entirety for all purposes.

FIELD

The disclosure relates to window shade systems, and more particularly, to an internal pocket or cassette that includes a light source that can provide illumination and security to exterior areas.

BACKGROUND

Window shade systems typically include a pocket (or space) for mounting the shade and another pocket for housing the wiring associated with the shade and other electronics. The window shade installer must often determine where to locate each of the pockets. The locations of the pockets may be important for not only accessibility, but also to comply with certain fire codes. An important part of the decision for the pocket location is the different codes that may apply to different areas. For example, items that exist in a room may be subject to different fire codes than items that exist in the ceiling or plenum. Such codes may determine if the contractor needs to include plenum cable or non-plenum cable. The type of jacket surrounding the cable may be impacted by the location of the cable.

The plenum spaces are between a drop and standard ceiling. The plenum spaces may also similarly exist in the floor space. These spaces are where the air in a building circulates, so these spaces are used to aid in heating and cooling functions. While non-plenum (PVC) cable is less expensive, plenum cable is often required when no conduit is used in the plenum spaces. Fire and smoke travel quickly in plenum spaces. As such, the levels of toxicity in the smoke are typically lower since plenum cable includes a jacket that is often comprised of flame-resistant material (e.g., Teflon). The flame-resistant material results in the cable smoking less than regular non-plenum (PVC) cable and the smoke that is emitted is less toxic. If the window shade pocket can be considered to be part of the room (and not part of the plenum), then the less expensive non-plenum cabling can be used in the pocket.

Moreover, a pocket that holds a window shade may be a very long structure. Because different pockets may need to accommodate different size shades, the pockets may vary in size. Furthermore, the pockets may include different features which may need to be incorporated into the pocket walls. The design of a pocket should take into consideration all of these features, while still being designed to be as light and inexpensive as possible.

SUMMARY

In various embodiments, the window shade pocket system may comprise a pocket having a first wall and a second wall; a window shade having a first side and a second side, wherein the window shade is mounted within the pocket and is configured to at least partially extend over a window outside of the pocket; and a first bracket removably affixed to at least one of a closure extending from the first wall, the first wall or the second wall, wherein the first bracket retains a light source, and wherein the light source is configured to illuminate an exterior area outside of the window. The pocket may be a cassette, the first wall may be a first end of the cassette, and the second wall may be a second end of the cassette.

In various embodiments, the light source may be configured to illuminate the exterior area outside of the window, in response to at least one of an opening of the window, an object coming through the window, a person coming through the window, an object passing by the window or a person passing by the window. The light source may be further configured to track at least one of an object passing by the window or a person passing by the window.

In various embodiments, the system may also include a motor configured to adjust at least one of the light source or the window shade. The motor may be configured to interface with a middle gear or belt to adjust both the light source and the window shade. The motor may be configured to adjust at least one of the light source or the window shade, wherein the motor receives input from at least one of a user input device, a motion sensor, other lights, security sensors, a daylight sensor, a brightness sensor, a solar tracking management system, a control system, a reporting system, a scheduling system or a weather sensor.

In various embodiments, the light source may include at least one of a light bulb, light bar, light strip, LED lighting, modular LED lighting, reflective device or fiber optics within the window shade. The light source may be at least one of covered by a lens, removeable from the first bracket or rotatable within the first bracket. The light source may be at least one of between the window shade and the window, or between a room and the window shade. The light source may be connected by at least one of a battery, power over ethernet, wireless radio frequency, network connection, a multi-pin connector or cable connector.

In various embodiments, the light source may be automated based on at least one of schedule, sunrise, sunset, ambient light level outside a building, ambient light level inside the building, occupancy, position of the window shade, sky condition or circadian rhythm optimization for an occupant of the building. The light source may include coupled sections that at least one of illuminate together or illuminate in zones. The light source may be configured to rotate within an enclosure that interfaces with the first bracket.

In various embodiments, the light source may include a network connection such that the light source is controlled and automated for at least one of activating, deactivating, dim level, frequency or color. The light source may be located in a bottom closure portion of the pocket such that the light source may be configured to be at least one of installed, removed or changed from below the pocket. The enclosure may include an interlock that may be configured to affix an angular rotation of the light source within the enclosure. The interlock may be configured to be accessible from outside of the pocket.

In various embodiments, the pocket may include a length extending from a first end of the pocket to a second end of the pocket, and wherein the first bracket extends along the length of the pocket from the first end of the pocket to the second end of the pocket. The first bracket may include at least one of a cable clip, metal retaining clip with a bent end or a spring clip wherein an end of the spring clip is bent behind a lip.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

As set forth in more detail in the attached drawings, the present disclosure may include cabling and other components 110 (e.g., power plug, splitter, electrical components, etc.) in the window shade pocket 100. The window shade pocket 100 may be outside of the plenum and considered part of the room, and not part of the ceiling. However, the window shade pocket 100 may be in the plenum, but the pocket 100 may still be considered part of the room. By including the cabling and other components in the window shade pocket 100, the cabling may not need to meet the more restrictive and more expensive ceiling fire codes. As such, the less expensive non-plenum (e.g., PVC) cabling may be used in the pocket 100.

In various embodiments, the cabling and other components 110 may be incorporated into the window shade pocket 100 in any manner. In this manner, the pocket 100 combines the functionality of a mounting space (e.g., for roller shades) and wiring space. In various embodiments, the window shade pocket 100 may include one or more permanent or removable channel that retains the cables and/or other components 110. In various embodiments, the pocket 100 and/or brackets 105 may be comprised of aluminum or non-metallic material. In various embodiments, the pocket 100 and/or brackets 105 may also be modular to support various ceiling systems and attachments. In various embodiments, the brackets 105 may be continuous down all or a portion of the pocket 100 (as set forth in FIG. 6) or may be spaced periodically along the inside of the pocket 100 (as set forth in FIG. 7).

Figure 6:
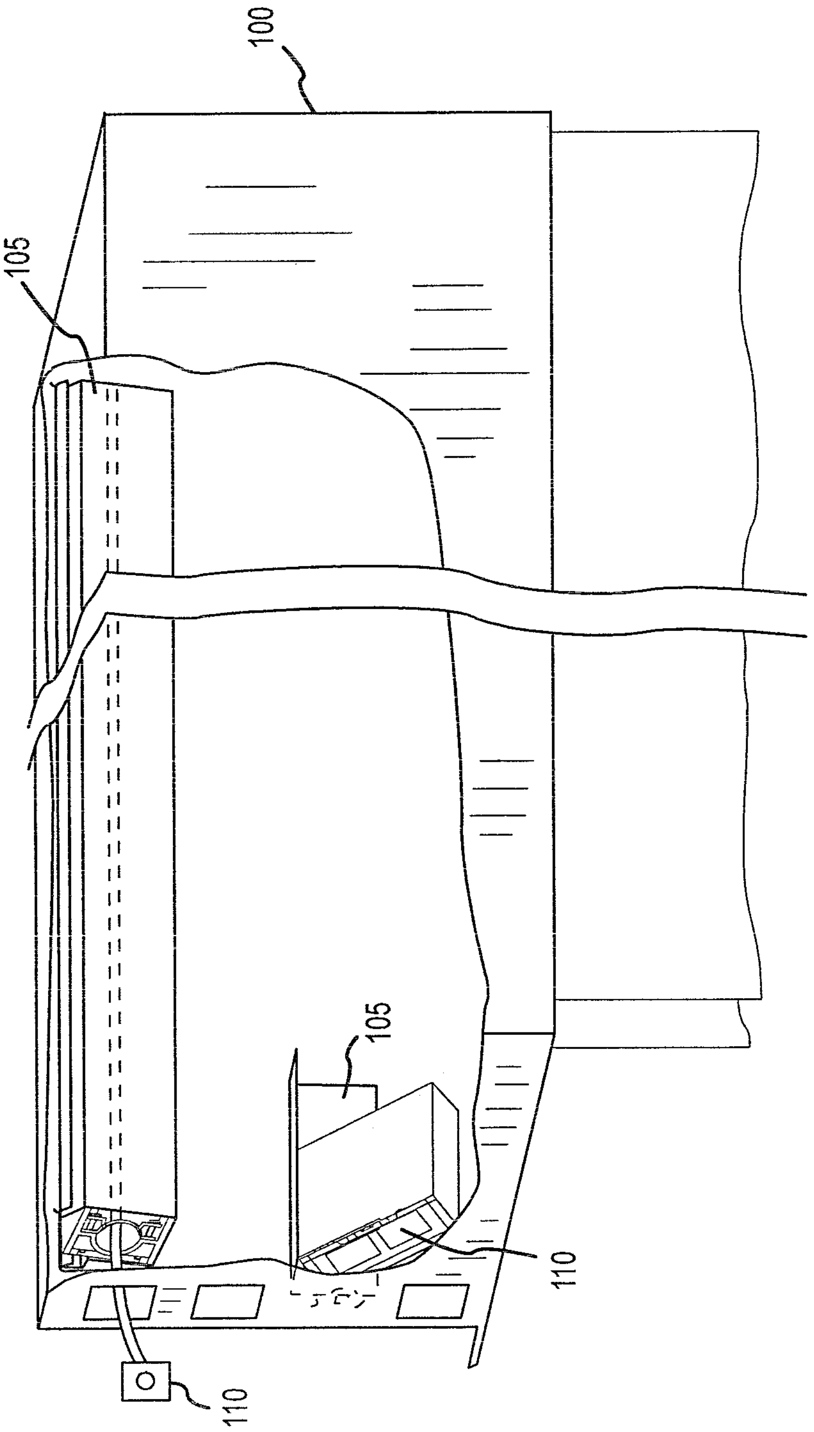
FIG. 6 is an exemplary diagram of a cut-away view of a window shade pocket showing a full first bracket, a second bracket and cabling, in accordance with various embodiments.
Figure 7:
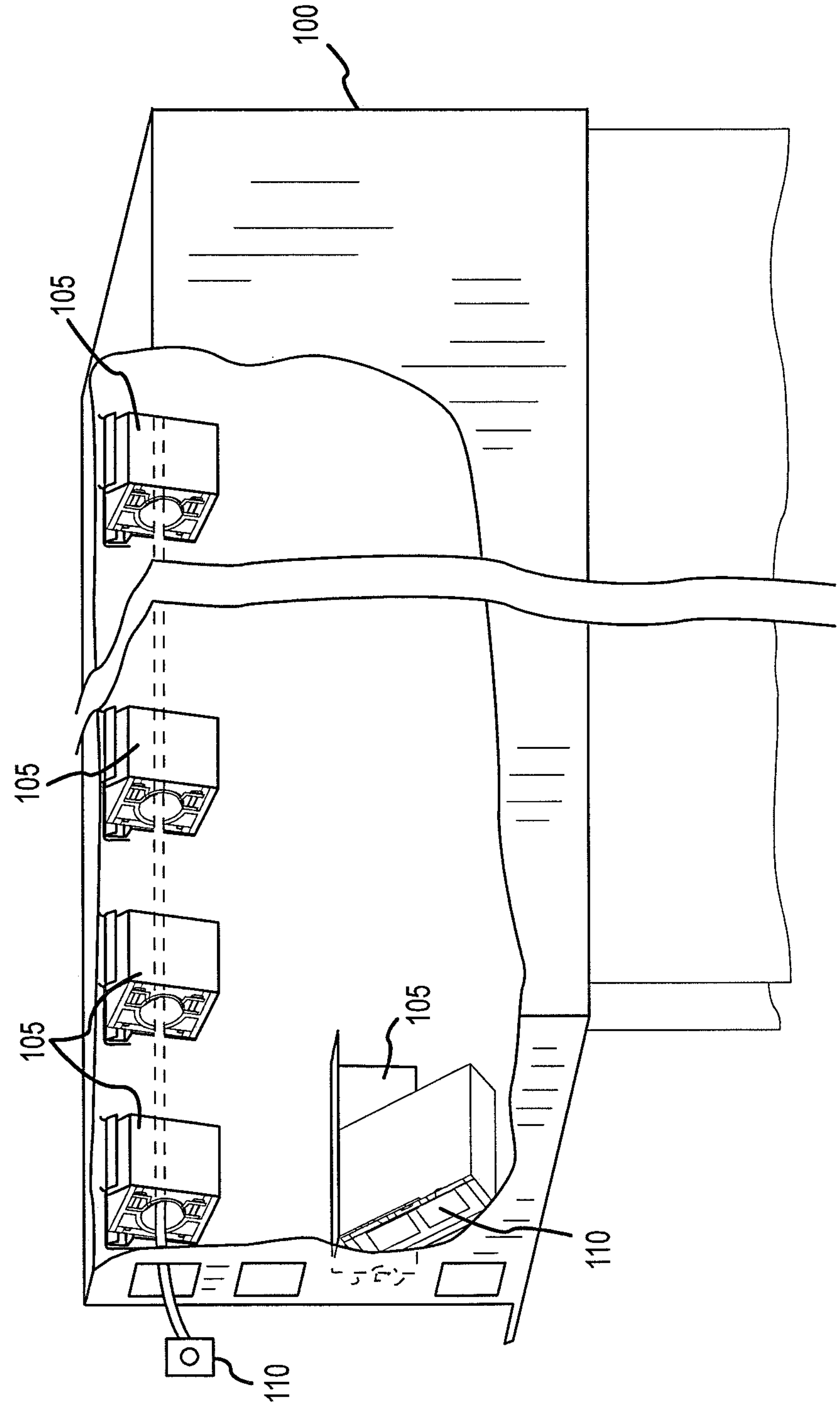
FIG. 7 is an exemplary diagram of a cut-away view of a window shade pocket showing a plurality of first brackets, a second bracket and cabling, in accordance with various embodiments.

In various embodiments, and as set forth in FIGS. 6-7, the cables may be held in the channels directly. Hooks, retaining clips and/or springs may allow access to the cabling. Clip-in-brackets 105 may be included to reduce weight and to reduce the cost of pocket 100. The clip-in-brackets 105 may be the entire length of the pocket 100, over a portion of the pocket 100 and/or multiple brackets 105 over specified separation mounting distances. The brackets 105 may mount on one or more of the faces of the pocket 100. The shade 115 may be removed (or more easily removed) after the retaining clip or channel is removed. The shade may also be removed around the bracket, while the bracket 105 is still installed.

The brackets 105 may be mounted to allow the roller shade to operate without impacting the bracket. The cabling may be serviced while protecting the cables from physical access or exposure to the rotating shade 115. In various embodiments, additional safety features may be incorporated into the system such as, for example, methods of separation of high and low voltage cabling to meet code (e.g., distance versus metal barrier). In various embodiments, the pocket 100 may be grounded and/or a junction box may be included in the pocket 100. In various embodiments, the pocket 100 may include venting options such as, for example, pre-punched holes and/or a removable back wall where a punched sheet can be inserted. Such venting features can even be added after installation. The hole sizes may be variable. The pocket 100 and brackets 105 may include features to prevent or minimize vibration for various attachments.

Figure 8:
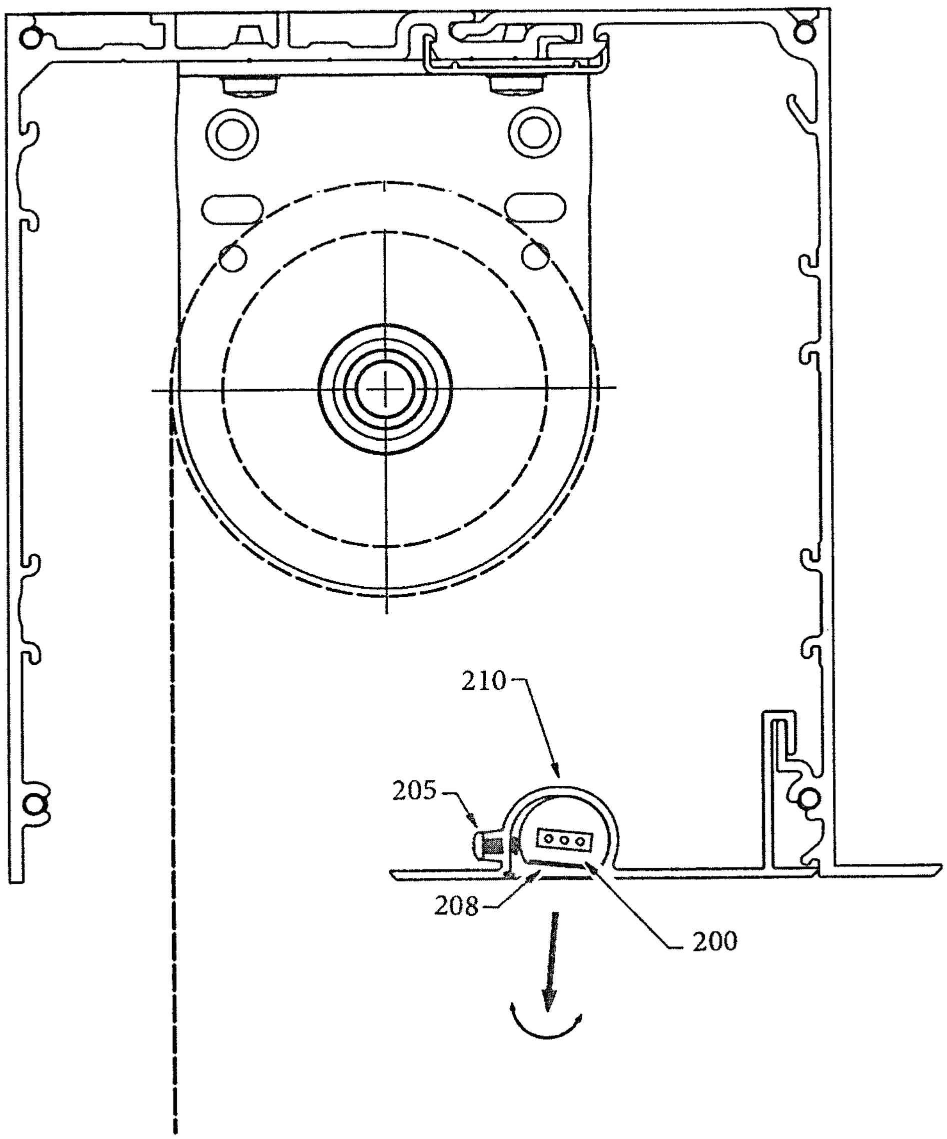
FIG. 8 is an exemplary diagram of a cut-away view of a window shade pocket showing a light source inserted into a bottom bracket attached to the pocket, in accordance with various embodiments.
Figure 9:
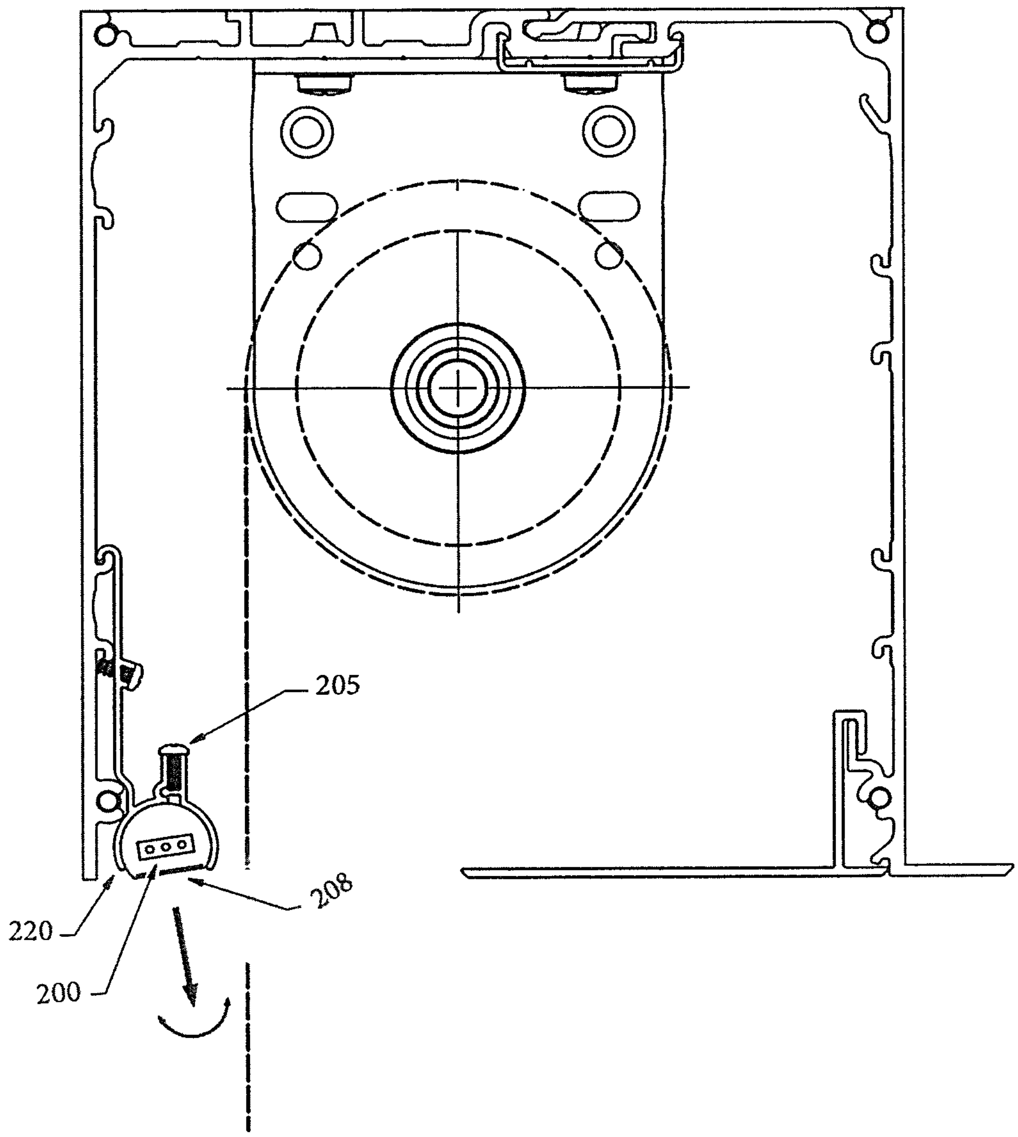
FIG. 9 is an exemplary diagram of a cut-away view of a window shade pocket showing a light source inserted into a side bracket attached to the pocket, in accordance with various embodiments.

More specifically, and in various embodiments, the window shade pocket 100 system may comprise a pocket 100 having an inside surface, a bracket 105 removably affixed to the inside surface of the pocket 100 and a roller shade 115 within the pocket 100. The inside surface of the pocket 100 may include a first wall 120, a second wall 125 and a third wall 130, wherein the third wall 130 may include the bracket 105 retaining the cabling. The bracket 105 may retain cabling and/or electrical components 110 within the bracket. The electrical components 110 may include a light source 200 and associated wiring, as shown in FIGS. 8 and 9. Bracket 105 may include a bracket 210 or 220, as shown in FIGS. 8 and 9, that may be configured to retain light source 200. The bracket 105 may include a plurality of brackets 105 along the inside surface of the pocket 100, wherein the cabling is retained within the plurality of brackets 105. The bracket 105 may form a channel between the bracket 105 and the inside surface of the pocket 100. The roller shade 115 may be able to be removed after the bracket 105 is removed or the roller shade 115 may be able to be removed while the bracket 105 is still affixed to the inside surface of the pocket 100.

Figure 1:
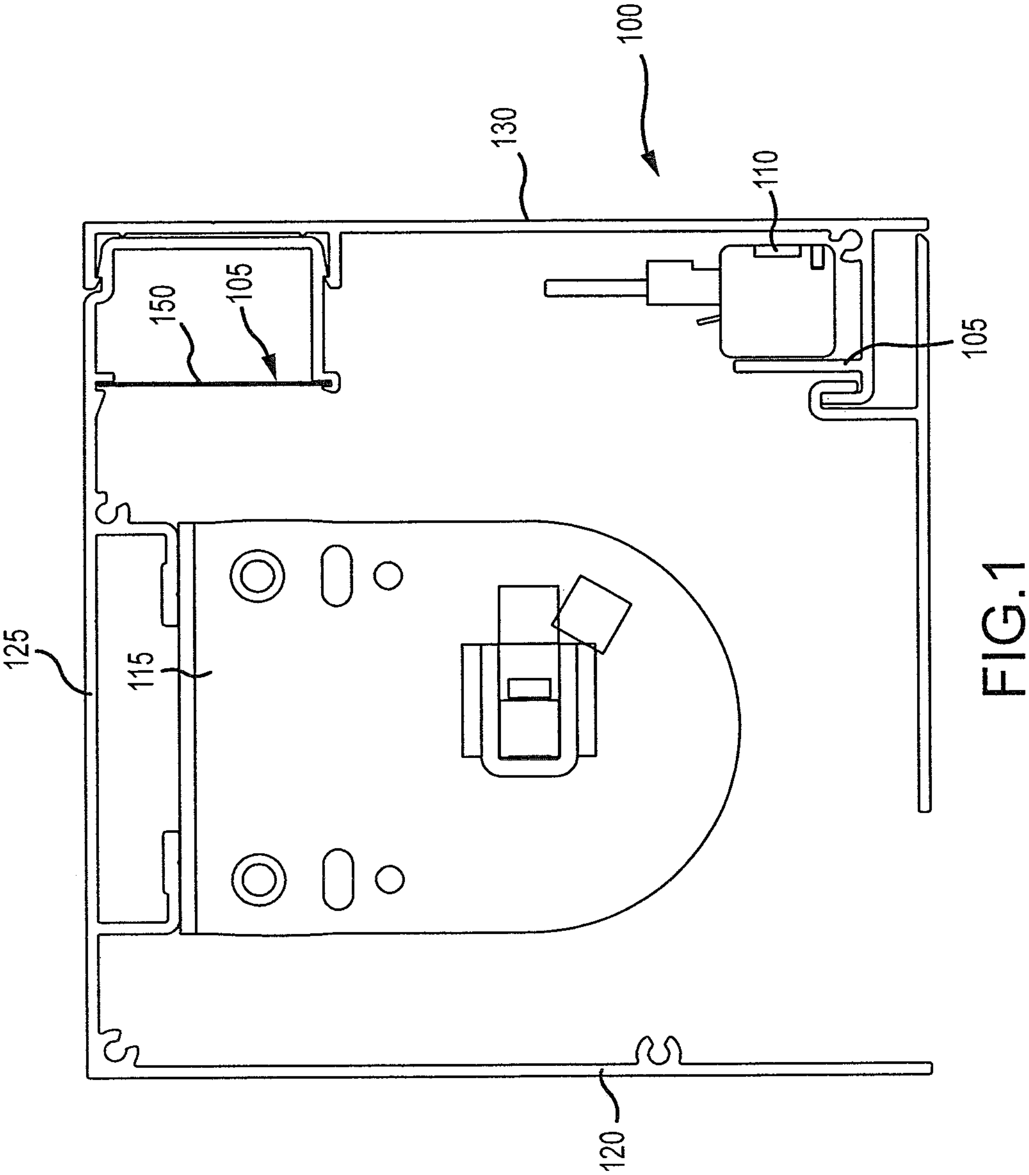
FIG. 1 is a schematic diagram of a window shade pocket with a roller shade and a planar bracket, in accordance with various embodiments.
Figure 2:
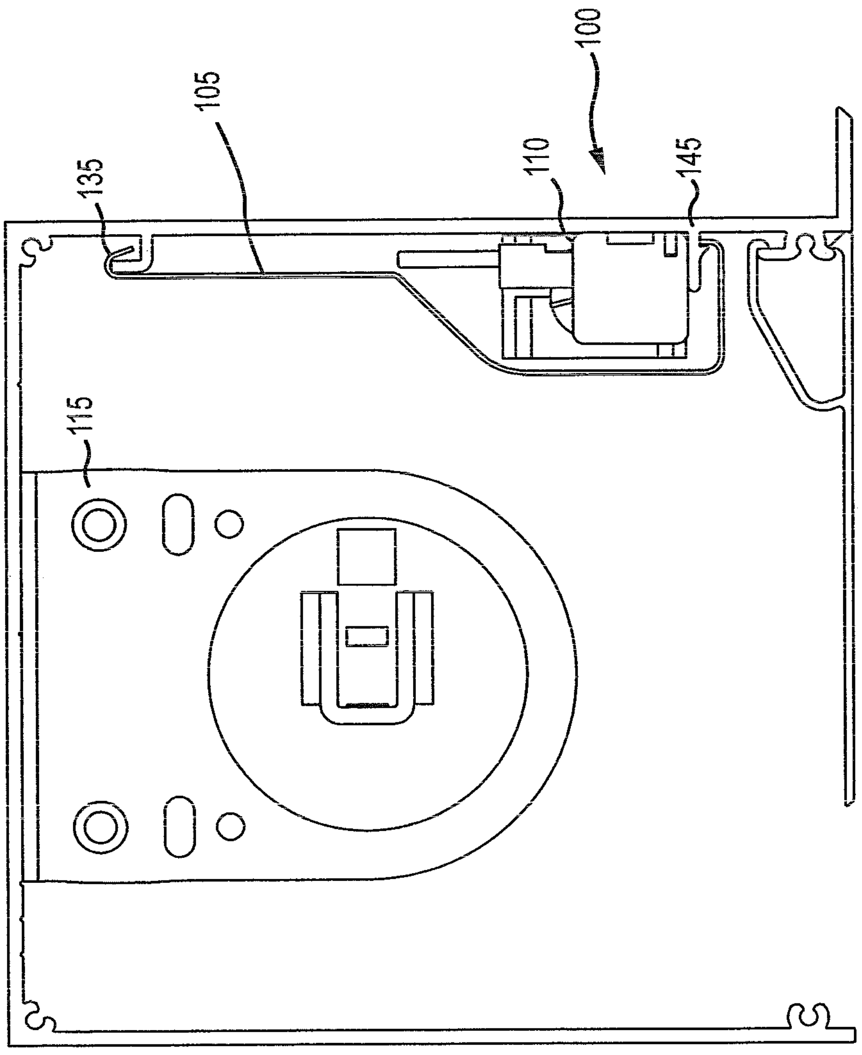
FIG. 2 is a schematic diagram of a window shade pocket with a roller shade and a bracket having a bent metal retaining clip, in accordance with various embodiments.
Figure 3:
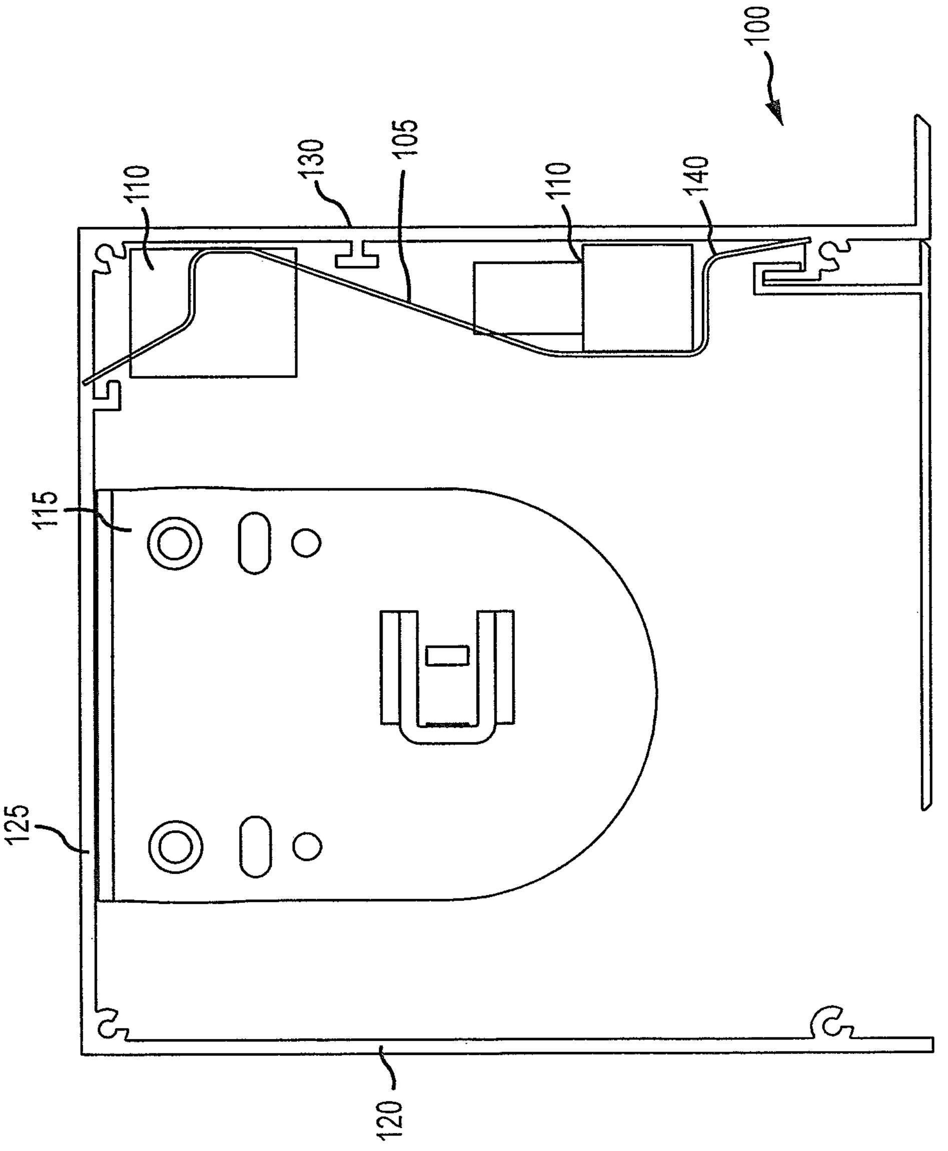
FIG. 3 is a schematic diagram of a window shade pocket with a roller shade and a bracket having a spring clip, in accordance with various embodiments.

In various embodiments, the bracket 105 may include a bent metal retaining clip 135 (as shown in FIG. 2) and/or a spring clip 140 (as shown in FIG. 3). The end of the bracket 105 may be retained behind a lip 145 (as shown in FIG. 2) extruding from a ledge. The end of the bracket 105 may be bent into an arc 135, wherein the arc is retained behind a lip extruding from a ledge. The bracket 105 may include a planar metal plate 150 (as shown in FIG. 1) having a top edge and a bottom edge, wherein the top edge is retained in a first channel and the bottom edge is retained in a second channel.

Figure 5:
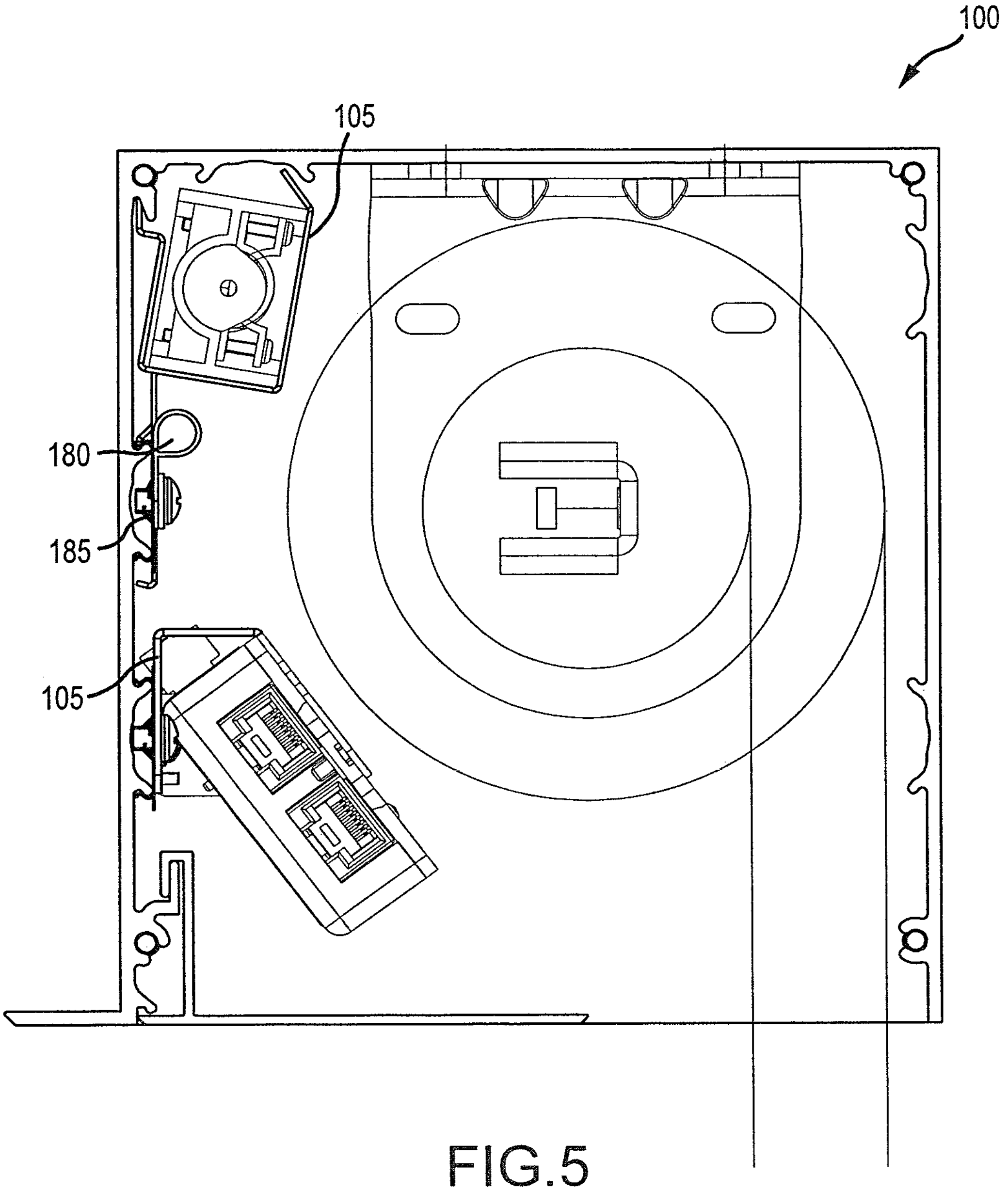
FIG. 5 is a schematic diagram of a window shade pocket with a roller shade and a additional bracket embodiments along with a cable clip, in accordance with various embodiments.

Additional bracket 105 embodiments are shown in FIG. 5 supporting different electronic components, but still avoiding contact with the roller shade. A cable clip 180 is also shown in FIG. 5. Cable clip 180 may be configured to receive a cable and provide support for the cable, while keeping the cable close to the side wall of pocket 100. Cable clip 180 and/or bracket 105 may attach to the side wall of pocket 100 using, for example, miter angles 185. Miter angles 185 include curved ends that partially wrap around the lips protruding from the side wall. Upon tightening the fastener against the side wall, the curved ends tightly engage the lips protruding from the side wall, thereby securely fastening bracket 105 to the side wall of pocket 100.

Figure 4:
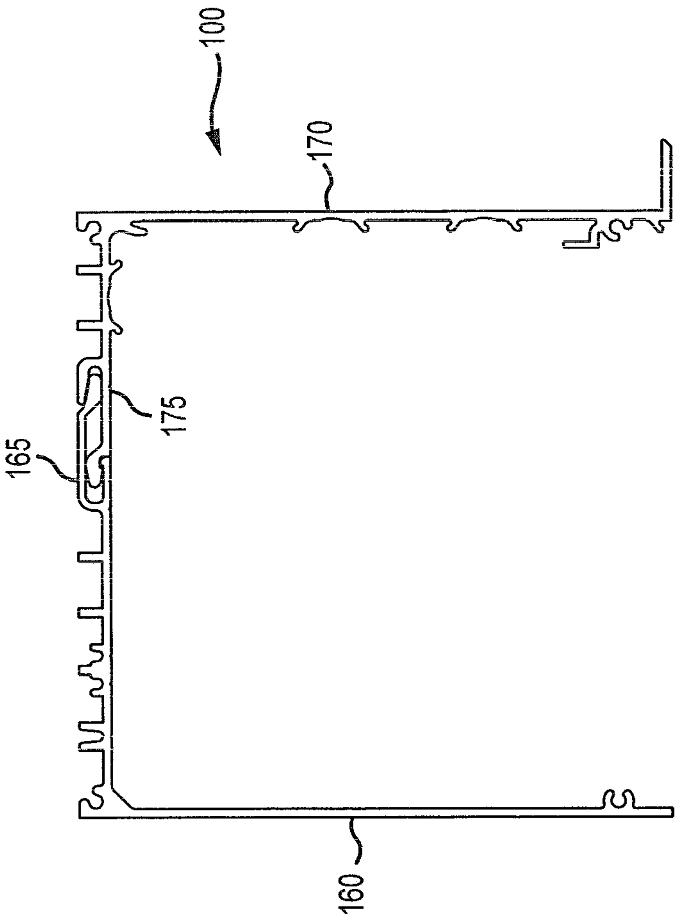
FIG. 4 is a schematic diagram of a window shade pocket showing the engagement device on the top wall, in accordance with various embodiments.

In various embodiments, and as shown in FIG. 4, the pocket 100 may be comprised of a first component 160 having a first engagement device 165 and a second component 170 having a second engagement device 175, wherein the first engagement device 165 engages the second engagement device 17 to form the pocket 100. Having the pocket 100 comprised of two components may allow for a smaller die to extrude the aluminum for each component. Moreover, having the pocket 100 comprised of two components provides the ability to have different widths assembled by only changing one of the components (extrusions). Having the pocket 100 comprised of two engaged components also provides the ability to have different features in the assembled pocket 100 by simply changing one of the extrusions. Furthermore, having the pocket 100 comprised of two engaged components also allows a design of the pocket 100 with thinner walls and thus makes the pocket 100 lighter and less expensive. However, having the pocket 100 comprised of two engaged components may not impact the brackets 105 and the electrical channels discussed herein because the engagement is on the top panel and not on the side panels where the brackets 105 may be inserted.

The disassembled pocket 100 may also be comprised of a first component 160 nested into a second component 170 to reduce space for shipping. The pocket 100 may be comprised of a first component and a replaceable second component, wherein the second component may be replaced with a third component (e.g., of a different size) that results in a different width of the pocket 100. Moreover, the second component 170 having a second bracket 105 may be replaced with a third component having a third bracket 105.

As briefly discussed above, bracket 105 may retain cabling and/or electrical components 110 within bracket 105. In various embodiments, the electrical components 110 may include a light source 200, as shown in FIGS. 8-11. The pocket may also include wiring or other components that support or are part of the light source. Bracket 105 may include a bracket 210, 220 or 230, as shown in FIGS. 8, 9 and 11 respectively, that may be configured to retain light source 200. The light source may include, for example, any type of light bulb, light bar, light strip (e.g., LED lighting), reflective device (e.g., mirror) and/or the like. An example of a light strip may include TSV16.4 Feet 300 Led RGB Muliticolor Changing RGB Led TV Backlight Strip Light Kit Sold By Wow Parts or the Monster Illumination Sound-Light Led 65" RGB Multicolor Changing Mood And Music Mode Light Strip sold by Monster. In various embodiments, the LED strips may be modular and extendable.

The lighting strips may connect via 2 or more pinholes on the end of the lighting strip for power. The lighting strips may also employ cable connectors. In various embodiments, the lighting strips may connect together with more connections when intelligent to accommodate both power and a network. For example, channel access may exist from the pocket area to the lighting strip. Such a configuration helps to ensure that the connection from the pocket wiring to the first lighting strip can be completed without having to machine the channel (or with minimal machining). The network could be POE (power over ethernet) which may power and network the light strip over a single cable or multi-pin connector. The network may also include wireless radio frequency to minimize cabling. Power may also be battery powered inside the pocket or inside the light strip. Via a network connection, the light source may be controlled and automated relative to on/off, dim level, frequency and/or color. Automation may be accomplished based on schedule, sunrise/sunset, ambient light level outside the building, ambient light level inside the building, occupancy, shade position, sky condition and/or circadian rhythm optimization for the occupant(s). When coupled together, the connected modular light sections may rotate together. When the light source is intelligent, the coupled sections 235 (as shown in FIG. 11) may all illuminate the same, or if networked, the coupled sections 235 may illuminate based on zone requirements.

In various embodiments, the bracket may be configured as an attachment to the pocket or to an enclosure, wherein the attachment may be configured to receive the light source. The attachment 210, 220 or 230 may include an enclosure for the light source, such that the light source may be removed from the enclosure (e.g., to replace the bulb) and/or rotate within the enclosure (e.g., to point the light closer to the window shade). The system may include an interlock for a screw 205 (or a device with similar functionality) to affix the angular rotation of the light source. In various embodiments, this interlock may be positioned on the exterior surface of the pocket with the adjustment surface facing down in order to promote easy access to adjust the angle. Access to the adjustment may be hidden behind a decorative cover to help minimize view of such less aesthetic features from the room.

Figure 10:
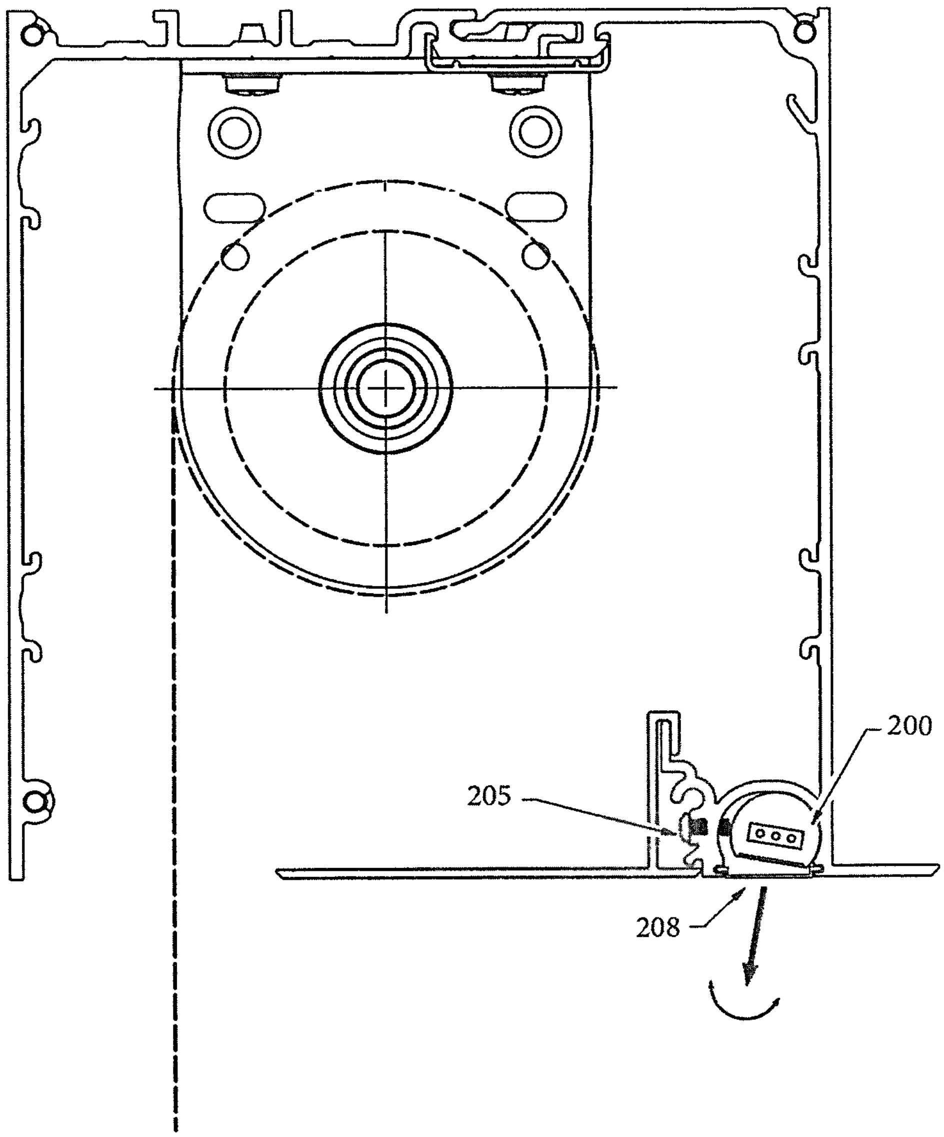
FIG. 10 is an exemplary diagram of a cut-away view of a window shade pocket showing a light source inserted into the bottom of the pocket, in accordance with various embodiments.
Figure 11:
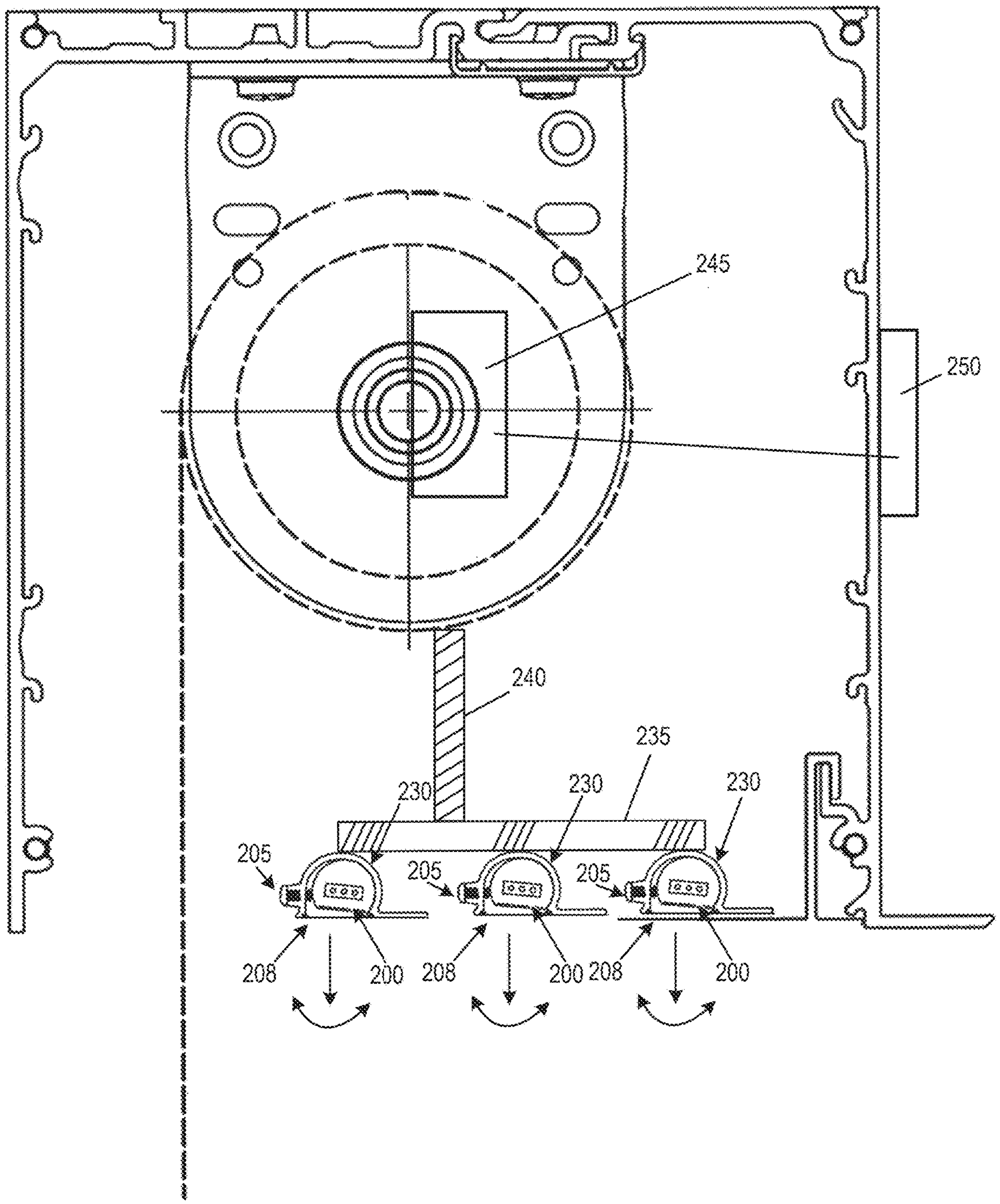
FIG. 11 is an exemplary diagram of a cut-away view of a window shade pocket showing a light source inserted into a bottom bracket attached to the end of an enclosure, wherein the enclosure is attached to the pocket, in accordance with various embodiments.
Figure 12:
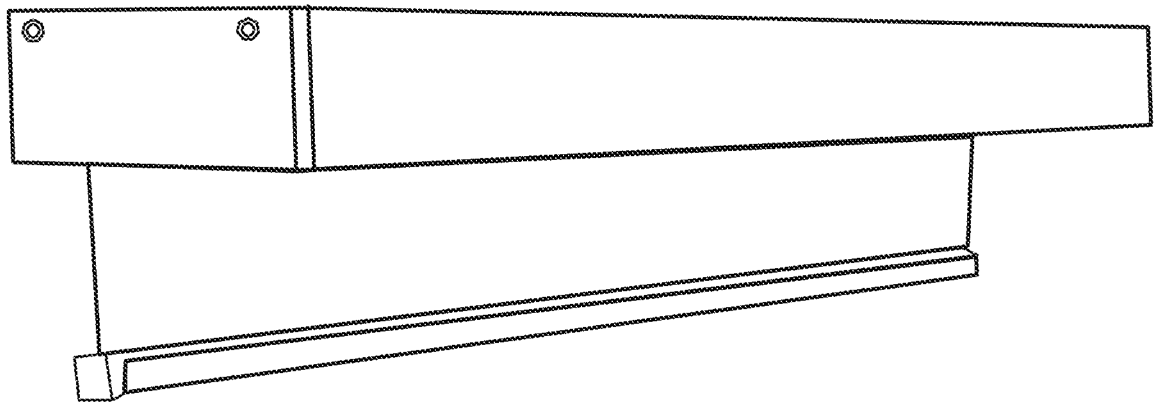
FIG. 12 shows an exemplary cassette, in accordance with various embodiments.

As set forth in FIG. 10, the light source may fit into a portion of the pocket (e.g., bottom portion). Because the pocket is stationary, the system may include a flexible mount to pop the light strip straight up and into the channel in the pocket from below. The light strip may also be slid into the channel. In various embodiments, when the LED strip section is installed into the pocket, and the wiring is not in the removable closure portion (covering a portion of the open bottom of the pocket) because the closure portion may not need to include any wiring. Moreover, the closure portion may be removed or installed without impacting the light source.

As set forth in FIG. 8, the attachment may attach to the pocket (e.g., attach to the side of the pocket), but extend horizontally outward and allow the light source 200 to shine downward, with different embodiments shown in each figure. As set forth in FIG. 11, the attachment may attach to the enclosure, wherein the enclosure attaches to the pocket. These configurations may allow lighting the shade from the interior of the room. As set forth in FIG. 9, the attachment may attach to a side surface of the pocket. This configuration may light the shade from the window direction. The attachment may include one or more interlocking fingers to temporarily secure the attachment to the pocket wall. A light strip or light bar may slide into a groove in the bracket or in the pocket wall. Different attachment configurations and/or locations may allow the light source to be closer or farther from the fabric surface.

In various embodiments, the light source may be in front of and/or behind the window shade fabric. The light source may light the shade in order to promote a certain decorative cosmetic, or the lighting of the shade may serve functional purpose within the room. Window shade fabric may have a certain openness factor or it may be a solid, blackout material. The openness factor may allow someone from the outside of a building to partially or fully see through the fabric and into the building, particularly when a room is lit up inside the building at night. Privacy and restricted viewing through the shade may be achieved by having a light source brighten the shade from the side of the viewer.

When lighting the shade from the interior and/or exterior, the light source may also include different colors to adjust the color of the window shade. Such color change may impact (e.g., benefit) the tone of the room, or the circadian rhythm of its occupants. The color changes may be dependent upon the time of day, season of the year, current sky conditions, holidays, temperature, working conditions, activities around the window shades (e.g., party, work-out, work), etc.

In various embodiments, the system may minimize or avoid shadows on the window shade fabric. For example, the system may be configured to include the light bar farther away from the fabric to minimize light shadows on the fabric. If the fabric has wrinkles or does not hang down with a smooth surface, the light may cause unsightly shadows on the fabric. The use of the light source on the fabric surface may reduce or eliminate such unsightly shadows on the window shade fabric. The light source may also reduce or eliminate hot spots on the window shade fabric.

In various embodiments, the system may include a lens (or lens cover) 208 over the light source. Any type, color or configuration of lens 208 may be included in the system. The lens 208 may focus or broaden a beam from the light source to change the light beam's impact on the window shade fabric's surface. The lens 208 may be over the light source and snap into the attachment device or in the pocket wall. The lens 208 may be configured to focus the light from the light source over the window shade fabric. The lens 208 may focus the light over a certain portion of the fabric, evenly over the entire fabric, evenly over the portion of the fabric that covers a certain area (e.g., the portion that covers the window), away from the fabric or any other distribution of light. The lens 208 may include textures and/or films to help diffuse the light. The lens 208 may be tinted in order to help control the color of the light. Some light sources (e.g., LEDs) may be tunable in color and/or spectrum, so tinted lenses may not be required.

The lens (or lens cover) 208 may be configured in various ways. The lens 208 may be built into the housing of the lighting strip. The lens 208 may be attached to the lighting strip. The lens 208 may rotate independent of the LED which helps minimize wiring from affecting the ease of rotation. The lens 208 may also be changed onsite to optimize to field conditions (allows more flexibility on site).

Figure 13:
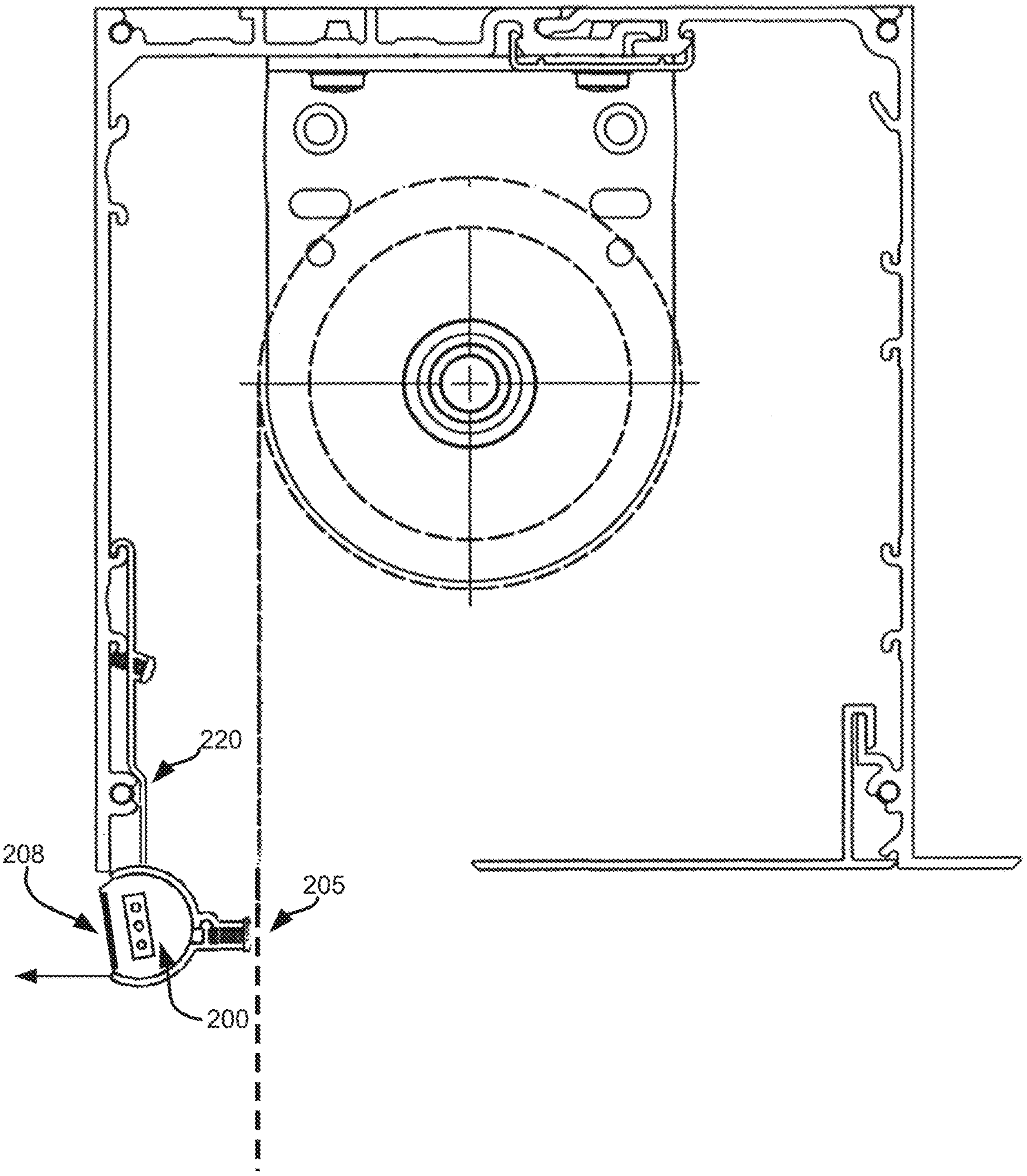
FIG. 13 shows an exemplary light source in a pocket that points the light external to the room, in accordance with various embodiments.

In various embodiments, and as shown in FIG. 13, light source 200 and/or lens 208 may be adjusted to point toward the window. By pointing light source 200 toward the window, light source 200 may shine through the window and illuminate the exterior area (outside of the building). As used herein, light source 200 and/or lens 208 may include a plurality of light sources 200 and/or lenses 208. Such plurality of light sources 200 and/or lenses 208 may be arranged in any pattern within and/or outside the pocket 100. The system may include the ability to manually adjust the light source 200 and/or lens 208. The system may include a similar set screw (as discussed above) to maintain the light source 200 and/or lens 208 in a certain position. The system may include a motor 245 (as shown in FIGS. 11 and 13) to adjust the light source 200 and/or lens 208. The system may use a separate motor 245 for adjusting each light source 200 and/or lens 208. The system may use one motor 245 for adjusting at least a subset of light sources 200 and/or lenses 208. The motor 245 that adjusts the window shade may also be used to adjust the light source 200 and/or lens 208. The window shade motor 245 may include a gear or belt that directly interfaces with or is directly geared to a motor 245 that adjusts the light source 200 and/or lens 208, such that movement of the window shade motor 245 adjusts both the window shade and the light source 200 and/or lens 208. In various embodiments, and as shown in FIGS. 11 and 13, a middle gear 240 may exist between the window shade gear and the gear for the light source 200 and/or lens 208. The size and configuration of the middle gear 240 may be used to adjust the gear ratios.

In various embodiments, the electrical components 110 may include a light source 200. The pocket may also include wiring or other components that support or are part of the light source. Bracket 105 may include a bracket 210, 220 or 230, as shown in FIGS. 8, 9 and 11 respectively, that may be configured to retain light source 200. The light source may include, for example, any type of light bulb, light bar, light strip (e.g., LED lighting), reflective device (e.g., mirror) and/or the like. An example of a light strip may include TSV16.4 Feet 300 Led RGB Muliticolor Changing RGB Led TV Backlight Strip Light Kit Sold By Wow Parts or the Monster Illumination Sound-Light Led 65" RGB Multicolor Changing Mood And Music Mode Light Strip sold by Monster. In various embodiments, the LED strips may be modular and extendable. The window shade may also include fibers that illuminate such that the window shade may be a light source. The fibers may be, for example, fiber optic fibers.

The light source may interface with a user input device, a motion sensor, other lights, security sensors, a daylight sensor, a brightness sensor, a solar tracking management system, a control system, a reporting system, a scheduling system, a weather sensor and/or any other type of sensor 250 (as shown in FIGS. 11 and 13) or system. The sensor 250 may provide input to adjust the light source. The light source 200 and/or the lens 208 may be adjusted to illuminate, further illuminate, reduce illumination, stop illumination, change the color of illumination, turn on and off the illumination (e.g., strobe), provide more focused illumination, provide broader illumination, provide established illumination patterns, adjust the illumination patterns based on other factors and/or provide random illumination patterns. The light source may adjust to follow a person or object outside of the building. The input may instruct the light source to adjust based on factors such as, for example, occupant preference, building manager preference, time of day, seasons of the year, a schedule, motion, daylight, brightness, darkness, solar changes, weather changes and/or the like. The system may include an override feature that allows any user to override any of the automated adjustments of the light source 200. The sensor 250 may be a security sensor that may be configured to monitor the opening of a window or anything coming through a window.

In various embodiments, the system may include smart controls. The system may integrate lighting and shading with other sub-system equipment for home and/or building automation. Such equipment may include, for example, occupancy sensors and/or security sensors that integrate fixture operation with the window area into whole building operation. For example, the systems may include life, fire and safety systems, security impacting internal and exterior lighting and/or other equipment. The equipment may include, for example, speakers, microphones, etc. which can integrate into an A/V and intercom systems for entertainment and/or access communication. The system may include a mounting device for any equipment (e.g., control equipment, automation equipment, power equipment, etc). The system may include DIN rails or other ways to conveniently inter-connect and mount the equipment. The equipment may facilitate automation. The equipment may include power equipment for renewables.

In various embodiments, the light source 200, the lens 208 and/or sensors may be located inside the pocket or outside of the pocket. For example, the light source 200, the lens 208 and/or sensors may be attached to a bracket on the inside surface of the pocket, hang down outside of the pocket but connected to a bracket that connects to the pocket, connected to a window, connected to a wall on the inside of a building, connected to the outside of a building, etc. The light source 200 and/or lens 208 may be mounted between the window shade and the window. The light source 200 and/or lens 208 may be mounted between the window shade and the interior of the building such that the light source 200 may shine through a transparent shade and out to the exterior of the building.

The light source 200, the lens 208 and/or sensors may be located inside a cassette or outside of the cassette. A cassette may be any pre-fabricated shade system. The pre-fabricated system may be in an enclosure that is mounted to wall brackets or ceiling brackets. The cassette may or may not include wiring, cabling, security, audio (speakers), visual (cameras), hvac, ceiling fan mounts, or other electronics. The wiring may be connectorized (pre-fabricated with connectors) and configured to be connect during or after installation. As used herein, pocket and cassette may be used interchangeably such that the features and functions discussed herein may apply to a pocket and/or a cassette.

For more details about pockets, cartridges, electronics and/or lighting, see U.S. Pat. No. 10,808,455 issued on Oct. 20, 2020 and entitled "Wired Pocket with Lighting"; and U.S. patent application Ser. No. 15/334,591 filed on Oct. 26, 2016 and entitled "Wired Pocket"; U.S. Provisional Application Ser. No. 62/247,036 filed on Oct. 27, 2015 and entitled "Wired Pocket," which are hereby incorporated by reference in their entirety for all purposes.

For further information about control systems and reporting systems, this application incorporates by reference for all purposes and in their entireties: U.S. Ser. No. 14/692,868 filed on Apr. 22, 2015 and entitled "Automated Shade Control system 130 Interaction With Building Management System"; PCT Application No. PCT/US2013/066316 filed on Oct. 23, 2013 and entitled "Automated Shade Control system 130 Utilizing Brightness Modeling"; U.S. Ser. No. 13/671,018 filed on Nov. 7, 2012, now U.S. Pat. No. 8,890,456 entitled "Automated Shade Control system 130 Utilizing Brightness Modeling"; U.S. Ser. No. 13/556,388 filed on Jul. 24, 2012, now U.S. Pat. No. 8,432,117 entitled "Automated Shade Control system 130"; U.S. Ser. No. 13/343,912 filed on Jan. 5, 2012, now U.S. Pat. No. 8,248,014 entitled "Automated Shade Control system 130"; U.S. Ser. No. 12/475,312 filed on May. 29, 2009, now U.S. Pat. No. 8,120,292 entitled "Automated Shade Control Reflectance Module"; U.S. Ser. No. 12/421,410 filed on Apr. 9, 2009, now U.S. Pat. No. 8,125,172 entitled "Automated Shade Control Method and System"; U.S. Ser. No. 12/197,863 filed on Aug. 25, 2008, now U.S. Pat. No. 7,977,904 entitled "Automated Shade Control Method and System"; U.S. Ser. No. 11/162,377 filed on Sep. 8, 2005, now U.S. Pat. No. 7,417,397 entitled "Automated Shade Control Method and System"; U.S. Ser. No. 10/906,817 filed on Mar. 8, 2005, and entitled "Automated Shade Control Method and System"; and U.S. Provisional No. 60/521,497 filed on May. 6, 2004, and entitled "Automated Shade Control Method and System."

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A window shade pocket system comprising:

a pocket having a first wall and a second wall;

a window shade, wherein the window shade is mounted within the pocket and is configured to at least partially extend over a window, wherein the window is at least partially outside of the pocket; and a first bracket removably affixed to at least one of a closure extending from the first wall, the first wall or the second wall, wherein the first bracket retains a light source, wherein the light source is mounted below the pocket, wherein the light source is located between the extended window shade and the window, wherein a lens of the light source is facing the window, and and wherein the light source is configured to point an entire light beam through the window to illuminate an exterior area outside of the window.

2. The window shade pocket system of claim 1, wherein the light source is configured to illuminate the exterior area outside of the window, in response to at least one of an opening of the window, an object coming through the window, a person coming through the window, an object passing by the window or a person passing by the window.

3. The window shade pocket system of claim 1, wherein the light source is further configured to track at least one of an object passing by the window or a person passing by the window.

4. The window shade pocket system of claim 1, wherein the pocket includes a cassette, the first wall is a first end of the cassette, and the second wall is a second end of the cassette.

5. The window shade pocket system of claim 1, further comprising a motor configured to adjust at least one of the light source or the window shade.

6. The window shade pocket system of claim 1, further comprising a motor configured to interface with a middle gear to adjust both the light source and the window shade.

7. The window shade pocket system of claim 1, further comprising a motor configured to adjust at least one of the light source or the window shade, wherein the motor receives input from at least one of a user input device, a motion sensor, other lights, security sensors, a daylight sensor, a brightness sensor, a solar tracking management system, a control system, a reporting system, a scheduling system or a weather sensor.

8. The window shade pocket system of claim 1, wherein the light source includes at least one of a light bulb, light bar, light strip, LED lighting, modular LED lighting, reflective device or fiber optics within the window shade.

9. The window shade pocket system of claim 1, wherein the light source is at least one of removeable from the first bracket or rotatable within the first bracket.

10. The window shade pocket system of claim 1, wherein another light source is between a room and the window shade.

11. The window shade pocket system of claim 1, wherein the light source is connected by at least one of a battery, power over ethernet, wireless radio frequency, network connection, a multi-pin connector or cable connector.

12. The window shade pocket system of claim 1, wherein the pocket includes a length extending from a first end of the pocket to a second end of the pocket, and wherein the first bracket extends along the length of the pocket from the first end of the pocket to the second end of the pocket.

13. The window shade pocket system of claim 1, wherein the first bracket includes at least one of a cable clip, metal retaining clip with a bent end or a spring clip wherein an end of the spring clip is bent behind a lip.

14. The window shade pocket system of claim 1, wherein the light source includes a network connection such that the light source is controlled and automated for at least one of activating, deactivating, dim level, frequency or color.

15. The window shade pocket system of claim 1, wherein the light source is located in a bottom closure portion of the pocket such that the light source is configured to be at least one of installed, removed or changed from below the pocket.

16. The window shade pocket system of claim 1, wherein an enclosure includes an interlock that is configured to affix an angular rotation of the light source within the enclosure.

17. The window shade pocket system of claim 16, wherein the interlock is configured to be accessible from outside of the pocket.

18. The window shade pocket system of claim 1, wherein the light source is automated based on at least one of schedule, sunrise, sunset, ambient light level outside a building, ambient light level inside the building, occupancy, position of the window shade, sky condition or circadian rhythm optimization for an occupant of the building.

19. The window shade pocket system of claim 1, wherein the light source includes coupled sections that at least one of illuminate together or illuminate in zones.

20. The window shade pocket system of claim 1, wherein the light source is configured to rotate within an enclosure that interfaces with the first bracket.

* * * * *